United States Patent
Kadowaki et al.

(10) Patent No.: US 6,898,169 B2
(45) Date of Patent: May 24, 2005

(54) OPTICAL PICKUP HEAD DEVICE, INFORMATION RECORDING/REPRODUCING APPARATUS, AND METHOD FOR RECORDING INFORMATION

(75) Inventors: Shin-ichi Kadowaki, Sanda (JP); Yoshiaki Komma, Hirakata (JP); Kousei Sano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 464 days.

(21) Appl. No.: 10/235,625

(22) Filed: Sep. 4, 2002

(65) Prior Publication Data
US 2003/0053395 A1 Mar. 20, 2003

(30) Foreign Application Priority Data
Sep. 14, 2001 (JP) ........................ 2001-279922

(51) Int. Cl.[7] .................................................. G11B 7/00
(52) U.S. Cl. ...................... 369/112.12; 369/109.02; 369/110.03; 369/112.04
(58) Field of Search ..................... 369/44.23, 44.24, 369/112.01, 112.02, 112.12, 110.03, 109.02, 112.04

(56) References Cited

U.S. PATENT DOCUMENTS 6,369,377 B1 * 4/2002 Shih et al. .................. 250/225

FOREIGN PATENT DOCUMENTS

JP  2000-331370  11/2000

* cited by examiner

Primary Examiner—Nabil Hindi
(74) Attorney, Agent, or Firm—Merchant & Gould P.C.

(57) ABSTRACT

An optical pickup head device includes a diffraction grating for generating zero-order diffracted light and at least first-order diffracted light and provides a tracking error signal with a DPP method. The diffraction grating includes grating patterns with a nonuniform period or phase. The size of the first-order diffracted light converged on an optical recording medium is larger in the direction parallel to a tangent to the track than in the direction perpendicular to the tangent. $P1/P0>PW2/PW1$ is established, where PW1 represents the power that is required to record information on the optical recording medium, PW2 represents the maximum power that allows information recorded on the optical recording medium to be reproduced without being erased, P0 represents the light amount of the zero-order diffracted light converged on the optical recording medium, and P1 represents the light amount of the at least first-order diffracted light converged on the optical recording medium. This configuration makes it possible to detect a tracking error signal with reduced offset, even if a recordable optical recording medium having two information recording planes is used.

15 Claims, 12 Drawing Sheets

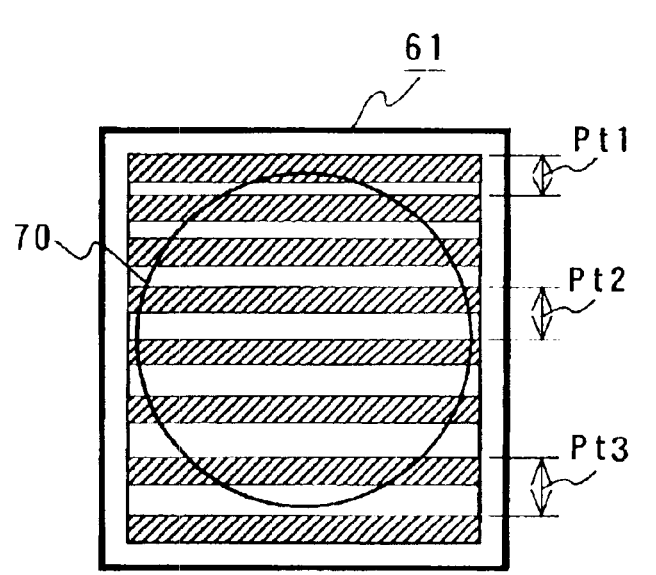
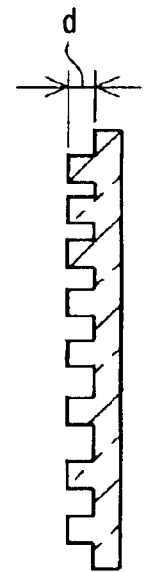
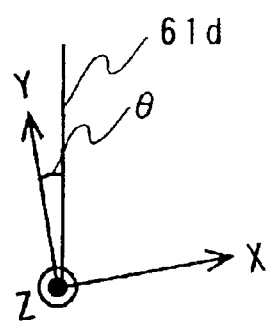
FIG.2A                    FIG.2B

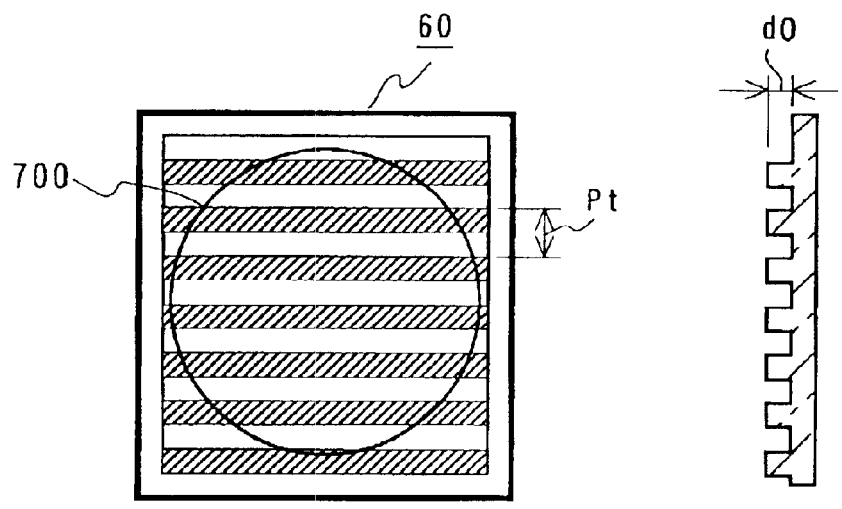
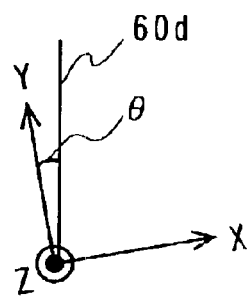
FIG.11A
PRIOR ART
FIG.11B
PRIOR ART

OPTICAL PICKUP HEAD DEVICE, INFORMATION RECORDING/ REPRODUCING APPARATUS, AND METHOD FOR RECORDING INFORMATION

BACKGROUND OF THE INVENTION

1. Field of the Invention

The present invention relates to an optical pickup head device that is used in an apparatus for recording, reproducing or erasing information on an optical recording medium and an information recording/reproducing apparatus. The present invention also relates to an information recording method that employs the optical pickup head device.

2. Description of the Related Art

An optical memory technique that uses optical disks having pit patterns as high-density large-capacity recording media is finding wide application, e.g., to digital audio disks, video disks, document file disks, and data files. In recent years, high-density large-capacity optical disks, called DVD, have been put to practical use and attracted considerable attention as information media that can handle mass information like animation. The DVD optical disks are recorded/reproduced with a so-called red semiconductor laser that emits a laser beam having a wavelength of about 650 nm.

FIG. 10 shows the configuration of a general optical system used in an optical pickup head device of an optical disk system that can perform recording and reproduction. A semiconductor laser source 1, i.e., a light source, emits a linearly polarized divergent beam 700 having a wavelength λ1 of 650 nm. The beam 700 emitted from the semiconductor laser 1 enters a diffraction grating 60. The diffraction grating 60 divides the beam 700 into three beams: a zero-order diffracted light beam and ±first-order diffracted light beams. The zero-order diffracted light beam is a main beam 700a for recording/reproducing information. The ±first-order diffracted light beams are two sub-beams 700b, 700c used for differential push-pull (DPP), with which a tracking error signal can be detected stably. To avoid unnecessary recording by the sub-beams, the ratio of diffraction efficiency of the zero-order diffracted light beam 700a to each of the first-order diffracted light beams 700b, 700c is generally about 20:1. The three beams 700a to 700c generated in the diffraction grating 60 pass through a polarizing beam splitter 52 and enter a collimator lens 53 having a focal length of 20 mm. The collimator lens 53 converts the beams into parallel light. The beams 700a to 700c thus collimated pass through a quarter-wave plate 54, where the beams are converted into circularly polarized light. Then, the beams are converted into convergent beams with an objective lens 56 having a focal length of 3 mm, pass through a transparent substrate 41a of an optical recording medium 41, and are focused on an information recording plane 41b. The aperture of the objective lens 56 is limited by an aperture 55 so that the NA is 0.6. The transparent substrate 41a has a thickness of 0.6 mm.

FIG. 11A is a front view schematically showing the diffraction grating 60, and FIG. 11B is a cross-sectional side view of the diffraction grating 60. A Y-direction is parallel to a tangent to the track on the optical recording medium 41 and an X-direction is perpendicular thereto. Straight grating patterns are formed on the diffraction grating 60 at an equal period of Pt. The grating depth d0 is set so that the ratio of light amount of the beam 700a to each of the beams 700b, 700c is 20:1. An angle θ between a spatial frequency axis 60d of the diffraction grating 60 and the Y-axis is determined by the positional relationship between the tracks on the information recording plane 41b and the focused beams 700a to 700c, and generally is in the range of about 1 to 2 degrees.

FIG. 12 shows the relationship between the beams 700a to 700c on the information recording plane 41b and the tracks. The optical recording medium 41 is provided with continuous grooves that serve as the tracks. The track period Tp is 0.74 μm. The beams are arranged so that when the main beam 700a is positioned on a track, each of the sub-beams 700b, 700c is positioned between tracks. In other words, a distance L between the main beam 700a and the sub-beam 700b or 700c in the direction perpendicular to the tracks is 0.37 μm.

The beams 700a to 700c reflected from the information recording plane 41b pass through the objective lens 56 and enter the quarter-wave plate 54, where the beams are converted into linearly polarized light that differs by 90 degrees from the light traveling from the semiconductor laser 1 to the optical recording medium 41. Then, the beams are converted into convergent beams by passing through the collimator lens 53 and reflected from the polarizing beam splitter 52. The beams 700a to 700c reflected from the polarizing beam splitter 52 pass through a cylindrical lens 57 and enter a photodetector 31. The transmission of beams 700a to 700c through the cylindrical lens 57 imparts astigmatism to the beams. The photodetector 31 includes eight light receiving portions 31a to 31h. The light receiving portions 31a to 31d receive the beam 700a, the light receiving portions 31e, 31f receive the beam 700b, and the light receiving portions 31g, 31h receive the beam 700c. Each of the light receiving portions 31a to 31h outputs a current signal that corresponds to the amount of light received.

The output signals of the light receiving portions 31a to 31d for receiving the main beam 700a are used to generate a focusing error signal with an astigmatism method, a tracking error signal with a phase-difference method, and a tracking error signal with a push-pull method. When a disk having continuous grooves such as DVD-RW (registered trademark) is recorded/reproduced, the output signals of the light receiving portions 31e to 31h for receiving the sub-beams 700b, 700c are used together with the output signals of the light receiving portions 31a to 31d so as to generate a tracking error signal with a DPP method. The focusing error signal and the tracking error signal are amplified to a desired level and phase-compensated, and then sent to actuators 91, 92, thereby performing focusing control and tracking control.

In DVD, a two-layer disk that includes two information recording planes is standardized for read-only ROM disks. A conventional optical pickup head device can read information from the read-only two-layer disk without any problems by detecting a tracking error signal with the phase-difference method.

Research and development of an optical recording medium having two recordable information recording planes (hereinafter, referred to as a two-layer recording disk) has yielded significant results. Since no information is written in the two-layer recording disk in its initial state, a tracking error signal cannot be detected with the phase-difference method. Accordingly, like an optical recording medium having a single recordable information recording plane (hereinafter, referred to as a single-layer recording disk), the tracking error signal should be detected with the DPP method.

However, there is a problem of using the two-layer recording disk in a conventional device having the above configuration. Even if a tracking error signal is detected by the DPP method, it causes uncorrectable offset fluctuations when the objective lens follows tracking or the optical recording medium tilts. The reason for this is as follows. When information is recorded on one of the information recording planes (hereinafter, this information recording plane is referred to as a focusing plane), the beam focused on the focusing plane is partly reflected and partly transmitted by the focusing plane. The transmitted beam reaches the other information recording plane (hereinafter, this information recording plane is referred to as a non-focusing plane) in a defocused manner. The beam reflected from the non-focusing plane also enters the photodetector. However, this beam cannot be cancelled completely by the DPP method for detecting a tracking error signal because of aberration, a nonuniform light amount of the beam, or the like. Therefore, the amount of beam that is not cancelled varies when the objective lens follows tracking or the optical recording medium tilts, causing offset fluctuations in the tracking error signal. As a result, off-track occurs and erases some of the information recorded on the adjacent tracks during recording, so that information recorded on the optical recording medium cannot be read faithfully.

SUMMARY OF THE INVENTION

Therefore, with the foregoing in mind, it is an object of the present invention to provide an optical pickup head device and an information recording method. The optical pickup head device can record information on an optical recording medium without erasing information recorded on the adjacent tracks and achieve faithful reading of the information recorded on the optical recording medium. Moreover, the optical pickup head device can reduce offset fluctuations in a tracking error signal even when an objective lens follows tracking or the optical recording medium tilts. Further, it is an object of the present invention to provide an information recording/reproducing apparatus that includes the optical pickup head device.

An optical pickup head device of the present invention includes the following: a light source for emitting a light beam; a diffraction means for diffracting the light beam from the light source into a plurality of beams of zero-order diffracted light and at least first-order diffracted light; a convergence means for converging the beams from the diffraction means on an optical recording medium; a beam splitting means for splitting the beams reflected from the optical recording medium; and a photodetection means for receiving the beams from the beam splitting means and outputting a signal that corresponds to the amount of light received. The optical recording medium includes tracks for recording information. The diffraction means includes grating patterns with a nonuniform period or phase. The size of the at least first-order diffracted light converged on the optical recording medium is larger in the direction parallel to a tangent to the track than in the direction perpendicular to the tangent. P1/P0>PW2/PW1 is established, where PW1 represents the power of the zero-order diffracted light converged on the optical recording medium that is required to record information on the optical recording medium, PW2 represents the maximum power of the zero-order diffracted light converged on the optical recording medium that allows information recorded on the optical recording medium to be reproduced without being erased, P0 represents the light amount of the zero-order diffracted light converged on the optical recording medium, and P1 represents the light amount of one of the at least first-order diffracted light converged on the optical recording medium.

An information recording/reproducing apparatus of the present invention includes the following: the optical pickup head device according to the present invention; a driver for changing a relative position between an information recording medium and the optical pickup head device; and an electric signal processor for performing an operation with a signal output from the optical pickup head device and providing desired information.

An information recording method of the present invention is a method for recording information on an optical recording medium with an optical pickup head device. The optical pickup head device includes the following: a light emitting means for emitting a plurality of light beams; a convergence means for converging the beams from the light emitting means on the optical recording medium; a beam splitting means for splitting the beams reflected from the optical recording medium; and a photodetection means for receiving the beams from the beam splitting means and outputting a signal that corresponds to the amount of light received. The optical recording medium includes tracks for recording information. The beams include a main beam and sub-beams: the main beam is used to record information on the optical recording medium by causing a physical change in the optical recording medium; and the sub-beams are the beams other than the main beam. The size of the sub-beams converged on the optical recording medium is larger in the direction parallel to a tangent to the track than in the direction perpendicular to the tangent. P1/P0>PW2/PW1 is established, where PW1 represents the power of the main beam converged on the optical recording medium that is required to record information on the optical recording medium, PW2 represents the maximum power of the main beam converged on the optical recording medium that allows information recorded on the optical recording medium to be reproduced without being erased, P0 represents the light amount of the main beam converged on the optical recording medium, and P1 represents the light amount of one of the sub-beams converged on the optical recording medium.

BRIEF DESCRIPTION OF THE DRAWINGS

FIG. 2A is a front view showing the configuration of a diffraction grating used in an optical pickup head device of Embodiment 1 of the present invention.

FIG. 2B is a cross-sectional side view of the diffraction grating.

FIG. 11A is a front view showing the configuration of a diffraction grating used in a conventional optical pickup head device, and FIG. 11B is a cross-sectional side view of the diffraction grating.

DESCRIPTION OF THE PREFERRED EMBODIMENTS

Figure 1:
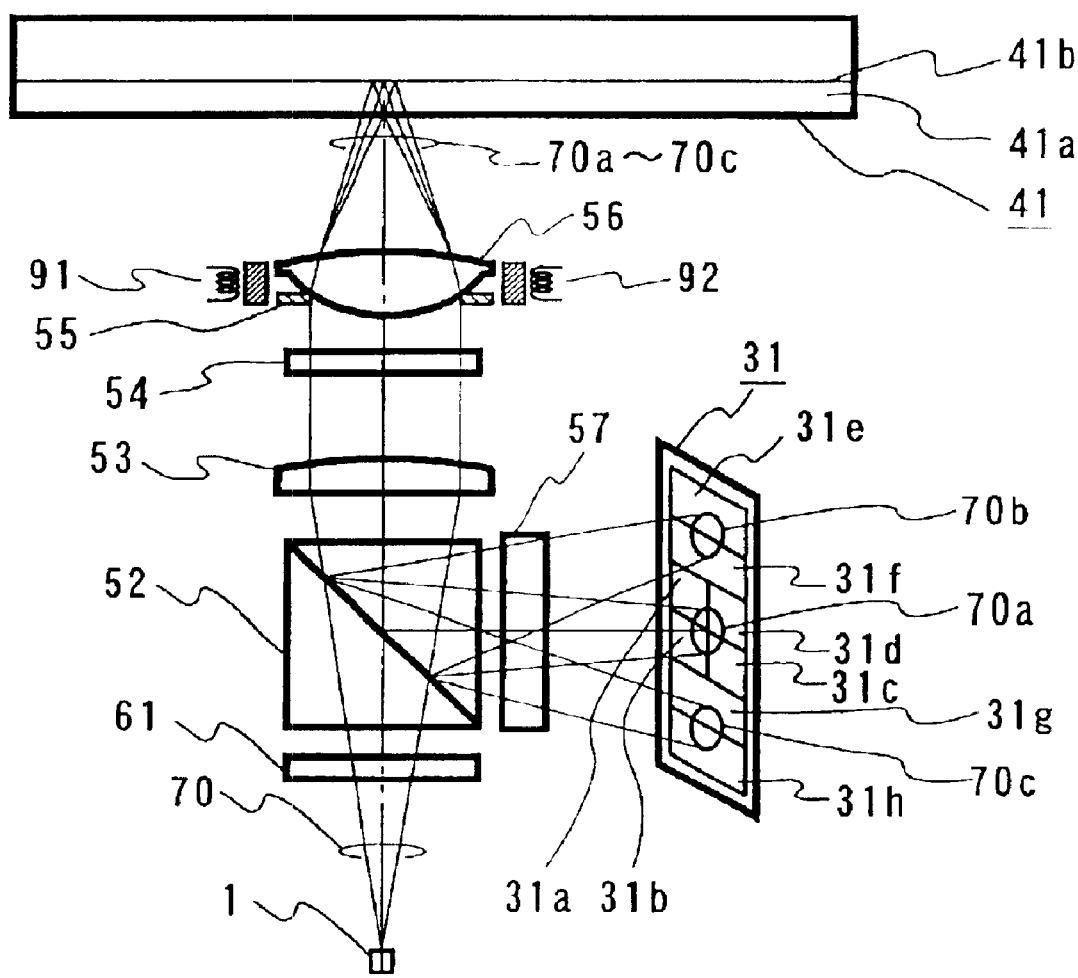
FIG. 1 is a schematic view showing the configuration of an optical pickup head device of Embodiment 1 of the present invention.

The above configuration of the present invention can reduce offset fluctuations in a tracking error signal detected by the DPP method even when an objective lens follows tracking or an optical recording medium tilts, so that off-track can be reduced as well. Therefore, when the optical recording medium is a recordable two-layer disk, information can be recorded without erasing some of the information recorded on the adjacent tracks. Thus, it is possible to achieve a highly reliable information recording/reproducing apparatus and information recording method that enable faithful reading of information recorded on the optical recording medium.

The diffraction means of the optical pickup head device of the present invention includes grating patterns with a non-uniform period or phase. The specific configuration of the grating patterns is not particularly limited. For example, the period of the grating patterns formed on the diffraction means may change gradually.

The grating patterns on both sides of a central portion of the diffraction means may differ from each other in phase. In this case, the phases of the grating patterns on both sides of the central portion may be reversed by 180 degrees with respect to each other. The central portion may have a different grating pattern from the grating patterns on both sides of the central portion, and the phases of the grating patterns on both sides of the central portion may be reversed by 180 degrees with respect to each other.

It is possible that the diffraction means includes a first pattern region, a second pattern region, and a third pattern region, the first pattern region is sandwiched between the second pattern region and the third pattern region, and a grating pattern is formed in the first pattern region and not in the second pattern region and the third pattern region.

It is possible that the diffraction means includes a first pattern region, a second pattern region, and a third pattern region, the first pattern region is sandwiched between the second pattern region and the third pattern region, and a grating pattern formed in the first pattern region differs from that formed in the second pattern region and the third pattern region.

In this case, it is preferable that the average depth of the grating pattern formed in the first pattern region is equal to the average depth of each of the second pattern region and the third pattern region.

In the optical pickup head device of the present invention, it is preferable that a plurality of diffracted light beams converged on the optical recording medium have the same size in the direction perpendicular to the tracks.

In the optical pickup head device of the present invention, it is preferable that the device satisfies $(S1/S0)^{0.5} \cdot PW2/PW1 > P1/P0 > PW2/PW1$, where $S0$ represents the size of the zero-order diffracted light converged on the optical recording medium in the direction parallel to a tangent to the track and $S1$ represents the size of the at least first-order diffracted light converged on the optical recording medium in the direction parallel to a tangent to the track.

The optical recording medium may include two or more information recording planes.

In the information recording method of the present invention, the light emitting means of the optical pickup head device that emits a plurality of light beams may include a light source for emitting a single light beam and a diffraction means for diffracting the single light beam into a plurality of beams of zero-order diffracted light and at least first-order diffracted light. Moreover, it is possible that the zero-order diffracted light is used as the main beam and the at least first-order diffracted light is used as the sub-beams, and that the diffraction means includes grating patterns with a nonuniform period or phase.

In this case, the grating patterns with a nonuniform period or phase can be formed specifically as described above.

Hereinafter, embodiments of an optical pickup head device, an information recording/reproducing apparatus, and an information recording method of the present invention will be described with reference to the accompanying drawings. In each of the drawings, identical elements that have the same effect and perform the same operation are denoted by the same reference numerals.

Embodiment 1

FIG. 1 shows an example of the configuration of an optical pickup head device of the present invention. A semiconductor laser source 1, i.e., a light source, emits a linearly polarized divergent beam 70 having a wavelength λ of 650 nm. The beam 70 emitted from the semiconductor laser 1 enters a diffraction grating 61. The diffraction grating 61 divides the beam 70 into three beams: a zero-order diffracted light beam and ±first-order diffracted light beams. The zero-order diffracted light beam is a main beam 70a for recording/reproducing information. The ±first-order diffracted light beams are two sub-beams 70b, 70c used for DPP, with which a tracking error signal can be detected stably. To avoid unnecessary recording by the sub-beams 70b, 70c, the ratio of diffraction efficiency of the zero-order diffracted light beam 70a to each of the first-order diffracted light beams 70b, 70c is generally about 20:1. In this embodiment, however, the ratio is 10:1. The three beams 70a to 70c generated in the diffraction grating 61 pass through a polarizing beam splitter 52 and enter a collimator lens 53 having a focal length of 20 mm. The collimator lens 53 converts the beams into parallel light. The beams 70a to 70c thus collimated pass through a quarter-wave plate 54, where the beams are converted into circularly polarized light. Then, the beams are converted into convergent beams with an objective lens 56 having a focal length of 3 mm, pass through a transparent substrate 41a of an optical recording medium 41, and are focused on an information recording plane 41b. The aperture of the objective lens 56 is limited by an aperture 55 so that the NA is 0.6. The transparent substrate 41a has a thickness of 0.6 mm.

The beams 70a to 70c reflected from the information recording plane 41b pass through the objective lens 56, where the beams are converted into parallel light. The beams 70a to 70c transmitted through the objective lens 56 enter the quarter-wave plate 54, where the beams are converted into linearly polarized light that differs by 90 degrees from the light traveling from the semiconductor laser 1 to the optical recording medium 41. Then, the beams are converted again into convergent beams by passing through the collimator lens 53. The beams 70a to 70c transmitted through the collimator lens 53 are reflected from the polarizing beam splitter 52. The beams 70a to 70c reflected from the polarizing beam splitter 52 pass through a cylindrical lens 57 and enter a photodetector 31. The transmission of the beams 70a to 70c through the cylindrical lens 57 imparts astigmatism to the beams. The photodetector 31 includes eight light receiving portions 31a to 31h. The light receiving portions 31a to 31d receive the beam 70a, the light receiving portions 31e, 31f receive the beam 70b, and the light receiving portions 31g, 31h receive 70c. Each of the light receiving portions 31a to 31h outputs a signal that corresponds to the amount of light received.

The light receiving portions 31a to 31h output current signals I31a to I31h that correspond to the amount of light received, respectively. Using the signals I31a to I31d output from the photodetector 31, a focusing error signal can be obtained with the astigmatism method, i.e., a calculation of (I31a+I31c)−(I31b+I31d). A tracking error signal can be obtained with the DPP method, i.e., a calculation of {(I31a+I31d)−(I31b+I31c)}−K·{(I31e+I31g)−(I31f+I31h)}. Here, K represents a coefficient that is determined by the ratio of diffraction efficiency of the zero-order diffracted light beam 70a to the first-order diffracted light beams 70b, 70c of the diffraction grating 61. The focusing error signal and the tracking error signal are amplified to a desired level and phase-compensated, and then sent to actuators 91, 92 for driving the objective lens 56, thereby performing focusing control and tracking control.

FIG. 2A is a front view schematically showing the diffraction grating 61, and FIG. 2B is a cross-sectional side view of the diffraction grating 61. A Y-direction is parallel to a tangent to the track on the optical recording medium 41 and an X-direction is perpendicular thereto. Straight grating patterns are formed on the diffraction grating 61. The period of the grating patterns changes gradually according to a position in the Y-direction, and there is the relationship given by Pt1<Pt2<Pt3, where Pt1 represents the grating period in the upper portion of the diffraction grating 61, Pt2 represents the grating period in the central portion, and Pt3 represents the grating period in the lower portion. The grating depth d is set so that the ratio of the light amount of the beam 70a to each of the beams 70b, 70c is 10:1. A maximum power PW2 of the zero-order diffracted light beam 70a with which the recordable optical recording medium 41 can be irradiated for reproducing information recorded thereon is 1 mW. An optimum power PW1 of the zero-order diffracted light beam 70a for recording information on the optical recording medium 41 is 12 mW.

Figure 3:
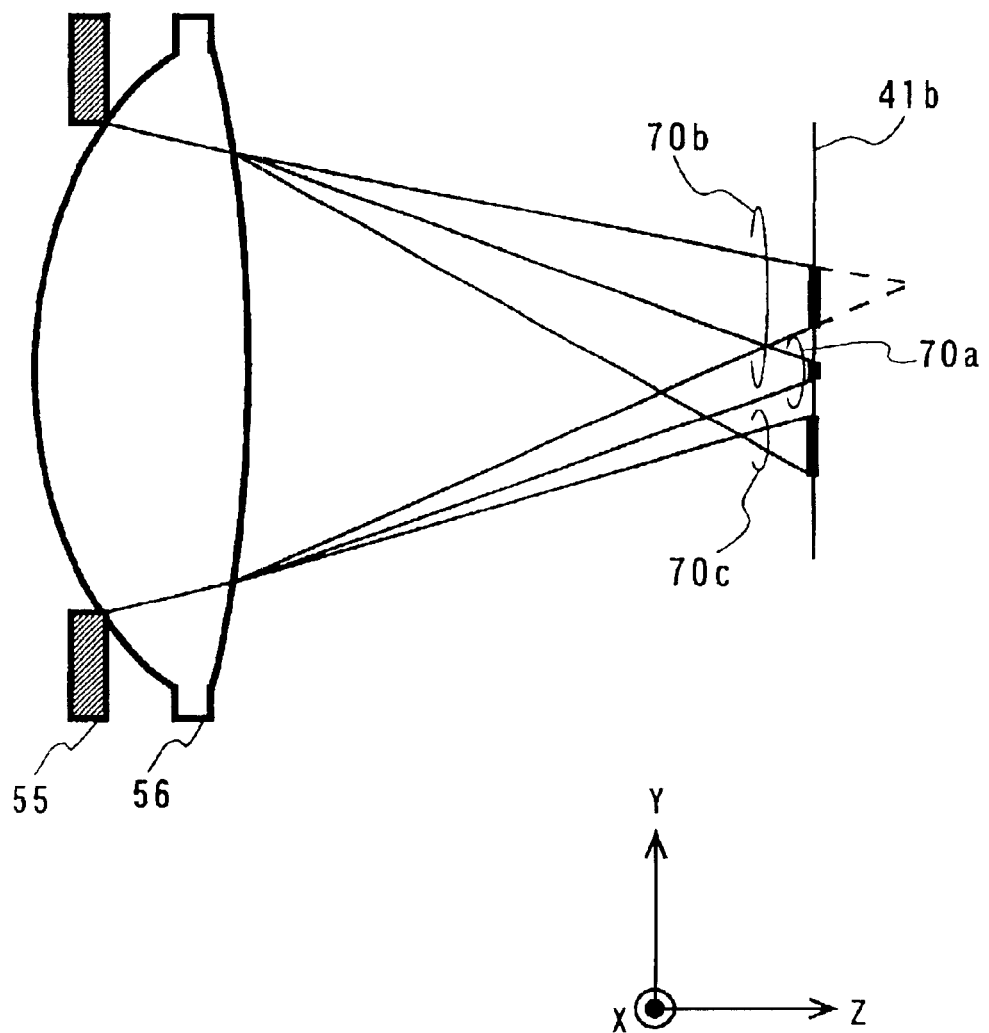
FIG. 3 shows the relationship between an information recording plane and beams in an optical pickup head device of Embodiment 1 of the present invention.
Figure 4:
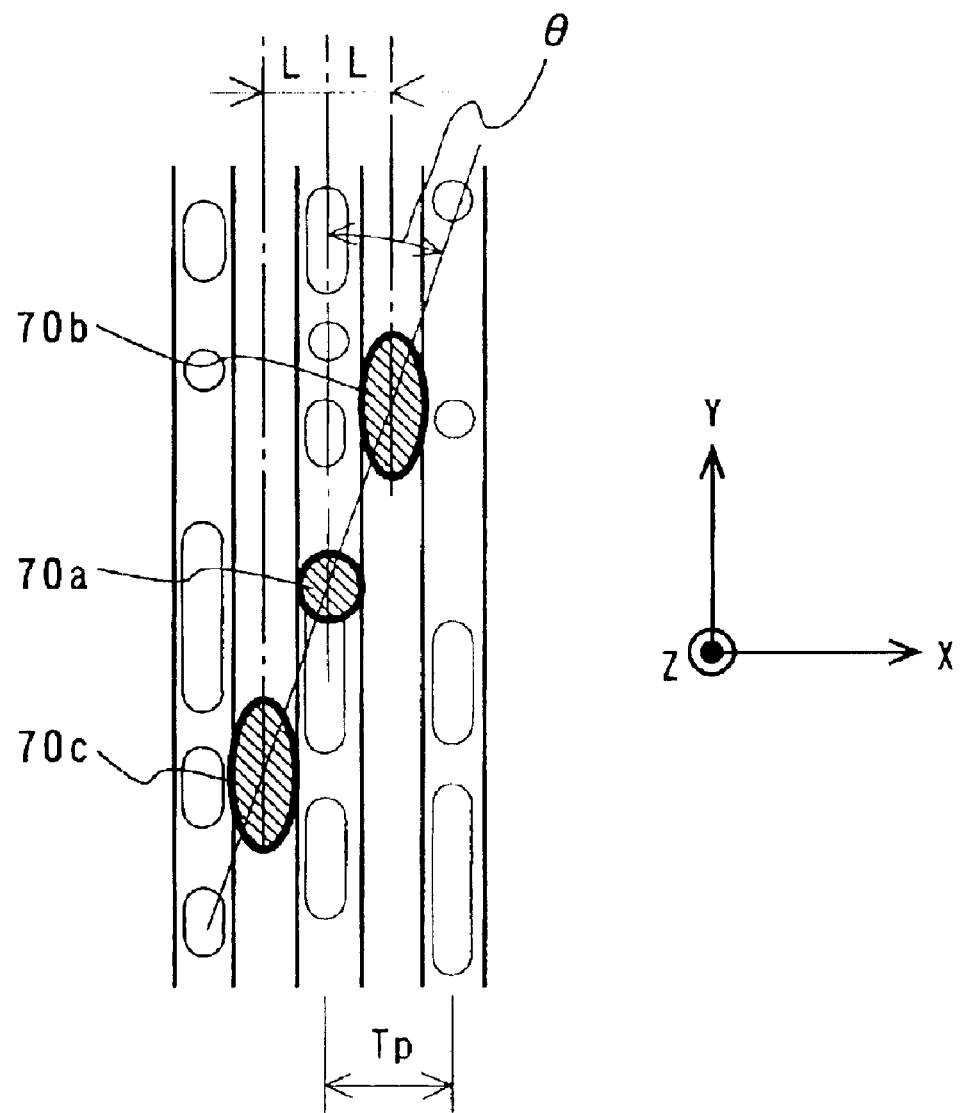
FIG. 4 shows the relationship between tracks and beams in an optical pickup head device of Embodiment 1 of the present invention.

FIG. 3 shows the beams 70a to 70c converged on the information recording plane 41b of the optical recording medium 41 with the objective lens 56. FIG. 4 schematically shows the beams 70a to 70c on the information recording plane 41b of the optical recording medium 41. The information recording plane 41b is provided with grooved tracks. The track pitch Tp is 0.74 μm. Information is recorded on the grooves. To detect a tracking error signal with the DPP method, the beams 70a to 70c are arranged so that when the beam 70a is positioned on a track, each of the beams 70b, 70c is positioned between tracks. In other words, both distances L between the beams 70a and 70b and between the beams 70a and 70c in the X-direction are Tp/2. An angle θ between an imaginary line containing the beams 70b, 70c and a track is generally 1 to 2 degrees. Since the angle θ is small, beam expansion in the direction perpendicular to the tracks is negligibly small, even if the direction in which the grating pattern period changes gradually is perpendicular to the grating patterns. By making the direction of change in grating pattern period perpendicular to the grating patterns, a large tolerance can be ensured in the X-direction for installing the diffraction grating 61 in the optical pickup head device. It should be noted that the diffraction grating can be produced by designing the grating patterns precisely to eliminate the beam expansion in the direction perpendicular to the tracks completely.

The beam 70a is converged to a diffraction-limited size and focused on the information recording plane 41b. The diffraction limit is determined by the wavelength λ of the semiconductor laser source 1 and the NA of the objective lens 56. The beams 70b, 70c are converged to the diffraction-limited size and focused on the information recording plane 41b in the XZ-plane. However, the beams 70b, 70c are not focused on the information recording plane 41b in the YZ-plane. When viewed from the objective lens 56, the beam 70c is focused on this side of the information recording plane 41b and the beam 70b is focused on the opposite side thereof. Therefore, the size of the beams 70b, 70c on the information recording plane 41b in the Y-direction is larger than the diffraction limit. A difference in focusing position in the YZ-plane between the beams 70b and 70c and their increased size in the Y-direction result from the fact that the period of the grating patterns formed on the diffraction grating 61 changes gradually in the Y-direction. The size of the beams 70b, 70c in the Y-direction can be designed arbitrarily by changing the grating pattern period of the diffraction grating 61. In this embodiment, the size is two times larger than the diffraction limit.

A detailed explanation of a method for designing the grating patterns of the diffraction grating 61 will be omitted because a general method for designing and producing a hologram can be employed. There is no particular limitation to a material for the diffraction grating 61, and resin or glass can be used. In this embodiment, the diffraction grating 61 is produced in the following manner: a master of the diffraction grating 61 is prepared, and then polyolefin resin is molded by using the master as a die.

The ratio of power P0 of the beam 70a focused on the information recording plane 41b to power P1 of each of the beams 70b, 70c is equal to the ratio of diffraction efficiency of the zero-order diffracted light beam to each of the first-order diffracted light beams of the diffraction grating 61, i.e., P0:P1=10:1. Therefore, there is the relationship given by P1/P0>PW2/PW1. For a conventional optical pickup head device, if P1/P0<PW2/PW1 is not established, information that has been recorded is erased by the sub-beams during recording of information on the optical recording medium 41. In contrast, the optical pickup head device of the present invention allows the size of the beams 70b, 70c on the information recording plane 41b to be made larger in the Y-direction. Therefore, the energy of the sub-beams 70b, 70c is dispersed due to the increased size. Consequently, even if P1/P0>PW2/PW1, the beams 70b, 70c do not erase information recorded on the information recording plane 41b.

It is not solely determined to what extent the sub-beams should be made large in the Y-direction so that information recorded on the information recording plane 41b is not erased. This is because the extent of increase in size of the sub-beams depends on the characteristics of a recording film that constitutes the information recording plane 41b. In general, the maximum irradiation power can be raised to about the square root of magnification at which the beam size is increased. In other words, S1/S0=2 can increase the power of the sub-beams by 1.4 times, where S0 represents the size of the zero-order diffracted light beam 70a (main beam) in the direction parallel to a tangent to the track, and S1 represents the size of the first-order diffracted light beams 70b, 70c (sub-beams) in the direction parallel to a tangent to the track.

The intensity of the first-order diffracted light beams is higher than that in a conventional optical pickup head device. Therefore, even if a two-layer recording disk is used as the optical recording medium, the optical pickup head device of the present invention is hardly affected by stray light generated by a beam reflected from the non-focusing plane. Moreover, the optical pickup head device can reduce offset fluctuations in a tracking error signal even when the objective lens 56 follows tracking or the optical recording medium tilts and thus can perform stable tracking control. In the case of a single-layer recording disk, offset fluctuations in a tracking error signal are caused when the objective lens 56 follows tracking, due to scratches and dirt on the optical recording medium or the optical components of the optical pickup head device. However, the optical pickup head device of the present invention can reduce the offset fluctuations in a tracking error signal and perform stable tracking control, as with the two-layer recording disk.

To enhance the light amount of the beams 70b, 70c for an improvement in stability of tracking control, the grating patterns may be designed so that the depth d of the diffraction grating 61 is increased to make the beams 70b, 70c larger in the Y-direction. The size of the beams 70b, 70c in the Y-direction can be set arbitrarily depending on the design of the grating patterns. The amplitude of a tracking error signal is affected by the size of the beams 70b, 70c in the X-direction and the track pitch and not by the size in the Y-direction. Therefore, though the size of the beams 70b, 70c in the Y-direction is made large in the optical pickup head device of the present invention, a favorable tracking error signal can be detected without adverse effect.

The configurations for recording information on the information recording plane 41b are classified into two types: groove format and land-groove format. In the groove format, information is recorded on either grooves or between the grooves, like DVD-RW (registered trademark). In the land-groove format, information is recorded on both grooves and between the grooves, like DVD-RAM (registered trademark). This embodiment describes an example of the groove format. However, the application of the optical pickup head device of the present invention to the land-groove format is not a problem.

A material for the information recording plane 41b of the optical recording medium is not particularly limited, as long as it causes a physical change in reflectance, refractive index, Kerr rotation angle, or the like by irradiation of light. All general optical recording materials, such as an organic dye material, a phase change material and magneto-optical material, can be used.

This embodiment uses the semiconductor laser having a wavelength of 650 nm as a light source and the objective lens having an NA of 0.6. However, the amount of information to be recorded on the optical recording medium can be increased by setting the wavelength of the light source to 405 nm and the NA of the objective lens to 0.85. Various modifications of the optical pickup device of the present invention may be made without departing from the sprit and the scope of the invention. Examples of such modifications include the following: a focusing detection method is changed from the astigmatism method to a spot size detection method, and a beam forming prism is used to enhance the light utilization efficiency.

In this embodiment, the first-order diffracted light beams 70b and 70c are the same in diffraction efficiency. However, the beams 70b, 70c may have different diffraction efficiencies. In that case, at least one of the first-order diffracted light beams should satisfy the above conditions.

In this embodiment, the first-order diffracted light beams generated in the diffraction grating 61 serve as the sub-beams. However, diffracted light with two or more orders may be used as the sub-beams.

Embodiment 2

Figure 5A:
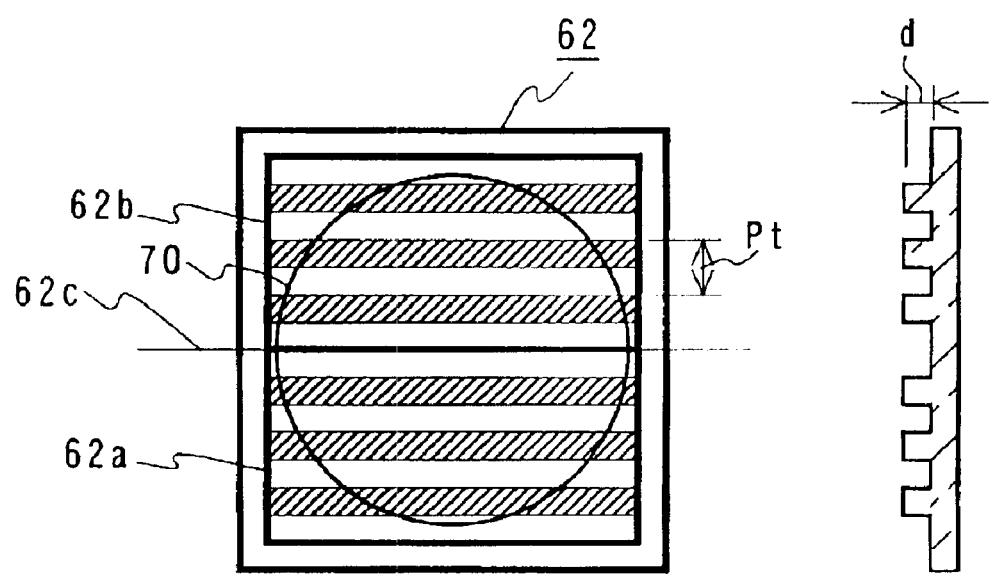
FIG. 5A is a front view showing the configuration of a diffraction grating used in an optical pickup head device of Embodiment 2 of the present invention.
Figure 5B:
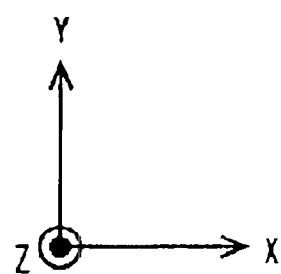
FIG. 5B is a cross-sectional side view of the diffraction grating.

FIG. 5A is a front view schematically showing a diffraction grating 62 used in another example of an optical pickup head device of the present invention, and FIG. 5B is a cross-sectional side view of the diffraction grating 62. The optical pickup head device can be formed by using the diffraction grating 62 instead of the diffraction grating 61 in Embodiment 1.

The diffraction grating 62 includes two pattern regions 62a and 62b. Both grating patterns formed in the pattern regions 62a, 62b are straight patterns and have a constant period of Pt. However, the phase is reversed at an imaginary boundary line 62c in the center of the diffraction grating 62 by 180 degrees. The diffraction grating 62 receives a beam 70 emitted from a semiconductor laser source 1 and generates a zero-order diffracted light beam 71a and first-order diffracted light beams 71b, 71c.

Figure 6:
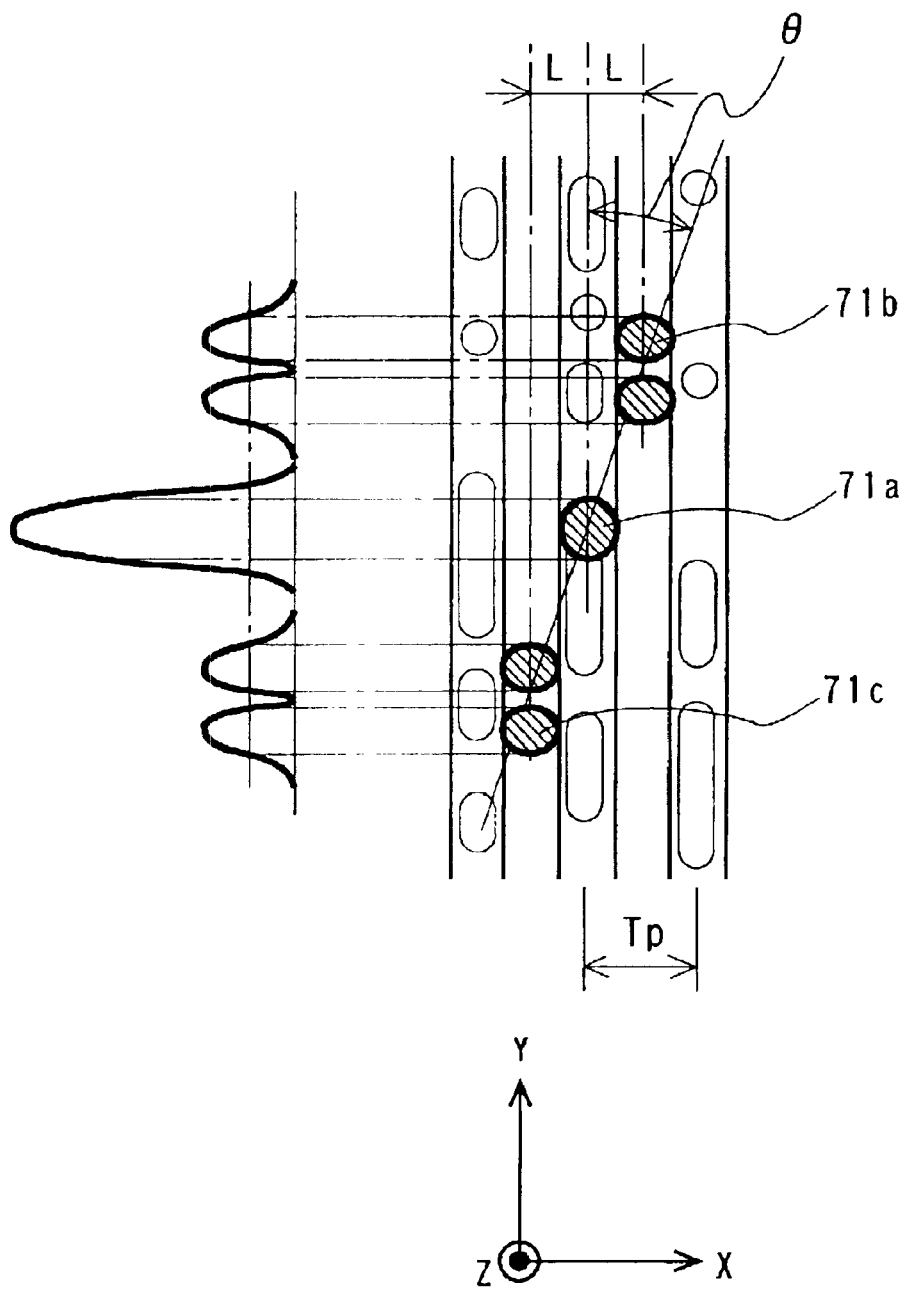
FIG. 6 shows the relationship between tracks and beams in an optical pickup head device of Embodiment 2 of the present invention.

FIG. 6 schematically shows the beams 71a to 71c on an information recording plane 41b of an optical recording medium 41, together with a change in light intensity of each beam spot on the left. The beam 71a is the zero-order diffracted light beam of the diffraction grating 62. Like the optical pickup head device of Embodiment 1, the beam 7 1a is converged to the diffraction-limited size, which is determined by the wavelength λ of the semiconductor laser light source 1 and the NA of an objective lens 56. The beams 71b, 71c are the first-order diffracted light beams of the diffraction grating 62. The beams 71b, 71c are converged to the diffraction-limited size in the X-direction. However, there are two peaks of intensity for each of the beams 71b, 71c, so that the size of the beams 71b, 71c in the Y-direction is about two times as large as the diffraction limit. The reason each of the beams 71b, 71c has two peaks of intensity and increases in size in the Y-direction is that the phases of the grating patterns 62a, 62b formed on the diffraction grating 62 are reversed by 180 degrees.

The optical pickup head device of this embodiment also allows the size of the beams 71b, 71c to increase in the Y-direction. Therefore, even if P1/P0>PW2/PW1 is established under the condition that the ratio of intensity of the beam 71a to each of the beam 71b, 71c is, e.g., 10:1, none of the beams 71b, 71c erases information recorded on the information recording plane 41b. Thus, a tracking error signal can be obtained that enables stable tracking control.

In the above example, the grating patterns formed in the regions 62a and 62b are reversed by 180 degrees with respect to each other. However, a phase difference between the two grating patterns is not necessarily 180 degrees, and the same effect can be obtained as long as the grating patterns have different phases.

Embodiment 3

Figure 7A:
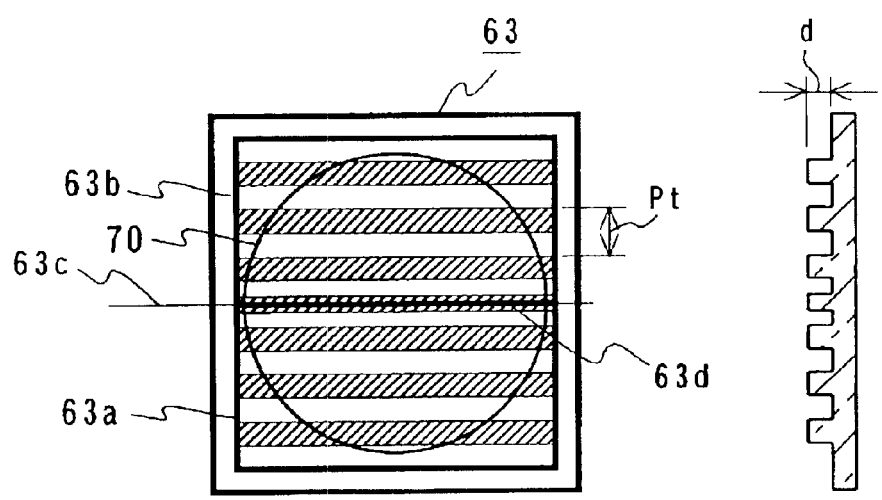
FIG. 7A is a front view showing the configuration of a diffraction grating used in an optical pickup head device of Embodiment 3 of the present invention.
Figure 7B:
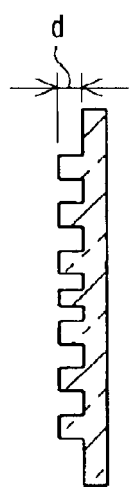
FIG. 7B is a cross-sectional side view of the diffraction grating.

FIG. 7A is a front view schematically showing a diffraction grating 63 used in another example of an optical pickup head device of the present invention, and FIG. 7B is a cross-sectional side view of the diffraction grating 63. The optical pickup head device can be formed by using the diffraction grating 63 instead of the diffraction grating 62 in Embodiment 2.

Like the diffraction grating 62, the diffraction grating 63 includes two pattern regions 63a and 63b. Both grating patterns formed in the pattern regions 63a, 63b are straight patterns and have a constant period of Pt. However, the phase is reversed at an imaginary boundary line 63c in the center of the diffraction grating 63 by 180 degrees. The diffraction grating 63 differs from the diffraction grating 62 in that a pattern 63d is provided at the boundary between the pattern regions 63a and 63b. The formation of the pattern 63d can reduce unnecessary light that is present between a zero-order diffracted light beam and each of first-order diffracted light beams of the diffraction grating 63 when those diffracted light beams are converged on an information recording plane 41b. Thus, a tracking error signal can be obtained that enables more stable tracking control In the above example, the grating patterns formed in the regions 63a and 63b are reversed by 180 degrees with respect to each other. However, a phase difference between the two grating patterns is not necessarily 180 degrees, and the same effect can be obtained as long as the grating patterns have different phases.

Embodiment 4

Figures 8A, 8B:
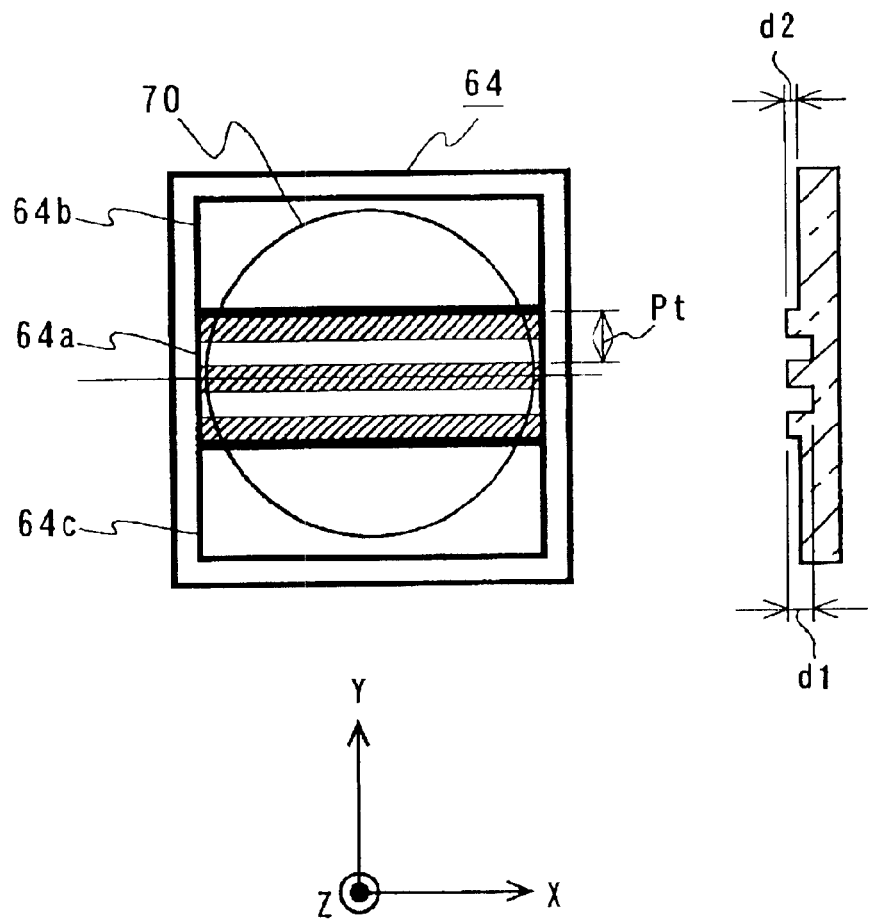
FIG. 8A is a front view showing the configuration of a diffraction grating used in an optical pickup head device of Embodiment 4 of the present invention.
FIG. 8B is a cross-sectional side view of the diffraction grating.

FIG. 8A is a front view schematically showing a diffraction grating 64 used in another example of an optical pickup head device of the present invention, and FIG. 8B is a cross-sectional side view of the diffraction grating 64. The optical pickup head device can be formed by using the diffraction grating 64 instead of the diffraction grating 63 in Embodiment 3.

The diffraction grating 64 includes three pattern regions 64a to 64c. The pattern region 64a is provided with a grating pattern having a period of Pt and a duty of 1:1. Neither of the pattern regions 64b, 64c is provided with a grating pattern. The whole beam 70 entering the pattern regions 64b, 64c is transmitted as a zero-order diffracted light beam. The relationship given by d2=d1/2 is established, where d1 represents the depth of the grating pattern formed in the pattern region 64a and d2 represents the depth of the pattern regions 64b, 64c (i.e., the distance from the top of the pattern region 64a). The depth d2 is set so that phase changes in the zero-order diffracted light beam caused when it passes through each of the pattern regions 64a to 64c of the diffraction grating 64 are the same. As a result, the zero-order diffracted light beam generated from the diffraction grating 64 can be converged to the diffraction-limited size on an information recording plane 41b. When the size of the pattern region 64a in the Y-direction corresponds to 1/a of the NA of an objective lens 56, first-order diffracted light beams that are generated in the diffraction grating 64 and focused on the information recording plane 41b can form spots whose size in the Y-direction is a times larger than the diffraction limit. Since a can be set arbitrarily in accordance with the necessary intensity of the first-order diffracted light beams, the intensity of the first-order diffracted light beams is increased sufficiently compared with a conventional optical pickup head device. Thus, an optical pickup device that is hardly affected by stray light can be achieved.

The pattern region 64a of the diffraction grating 64 is smaller than the NA of the objective lens 56. Therefore, to ensure the same power of the sub-beams converged on the information recording plane 41b as that produced by the diffraction gratings 61, 62 or 63, the diffraction efficiency of the first-order diffracted light beams in the pattern region 64a should be higher than that of the first-order diffracted light beams of the diffraction gratings 61 to 63. In this case, the light amount of the zero-order diffracted light beam passing through the pattern region 64a is less than that passing through the pattern regions 64b, 64c. Accordingly, the zero-order diffracted light beam focused on the information recording plane 41b can form a super-resolution spot, and thus the size of the spot of the zero-order diffracted light beam in the direction parallel to a tangent to the track (Y-direction) becomes smaller than the diffraction limit. This can improve the response characteristics at higher frequencies during reproduction of information recorded on the optical recording medium 41 and suppress errors even in the presence of noise, thereby achieving an optical pickup head device capable of reproducing highly reliable information.

In the optical pickup head device of this embodiment, a grating pattern is not formed in the pattern regions 64b, 64c. However, a grating pattern having a different period from that of the pattern region 64a may be formed in each of the pattern regions 64b, 64c, which leads to an optical pickup head device that can provide a tracking error signal to enable stable tracking control.

Embodiment 5

Figure 9:
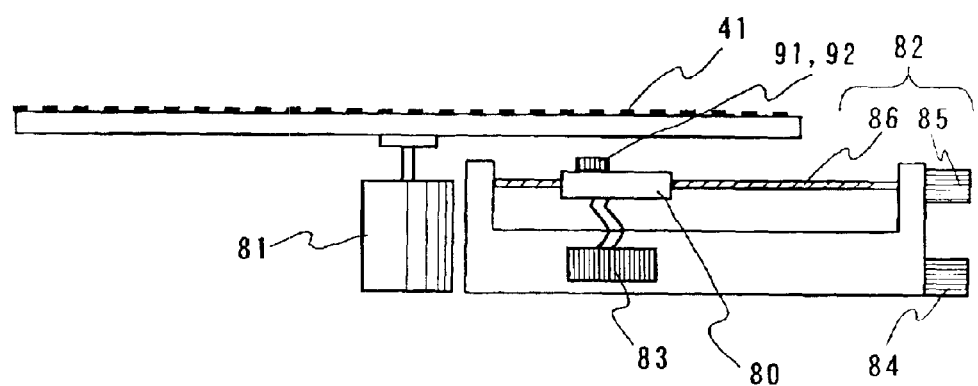
FIG. 9 is a schematic view showing the configuration of an information recording/reproducing apparatus of Embodiment 5 of the present invention.
Figure 10:
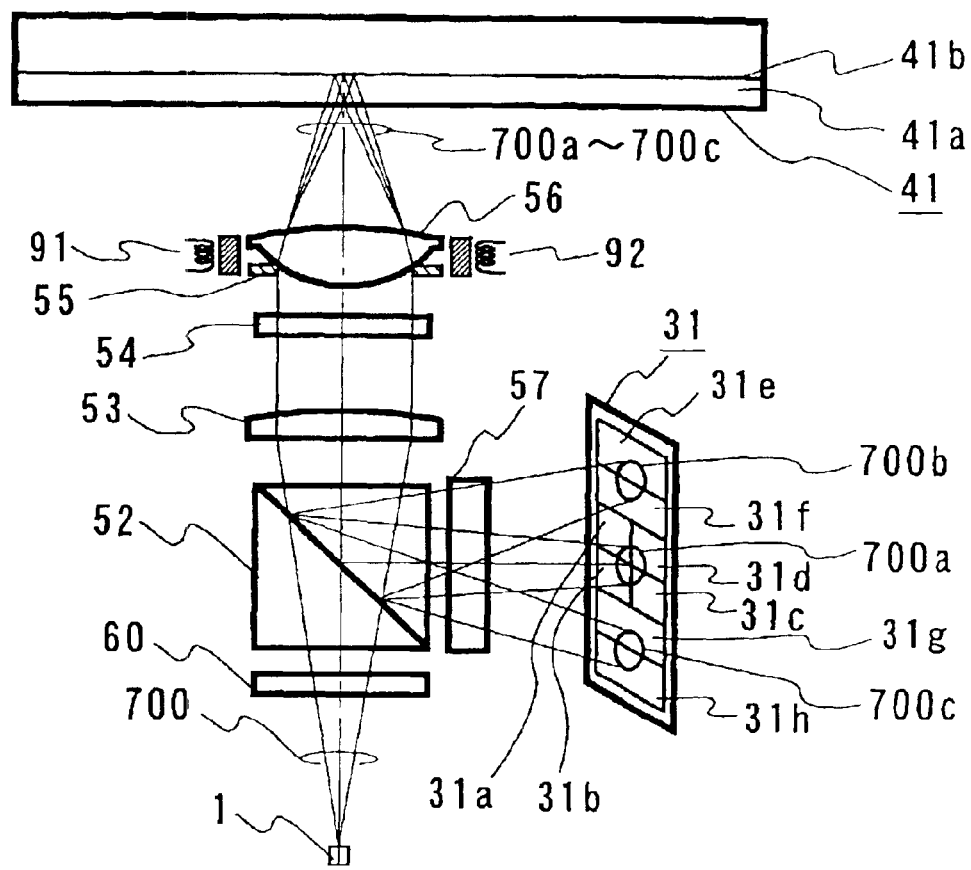
FIG. 10 is a schematic view showing the configuration of a conventional optical pickup head device.
Figure 12:
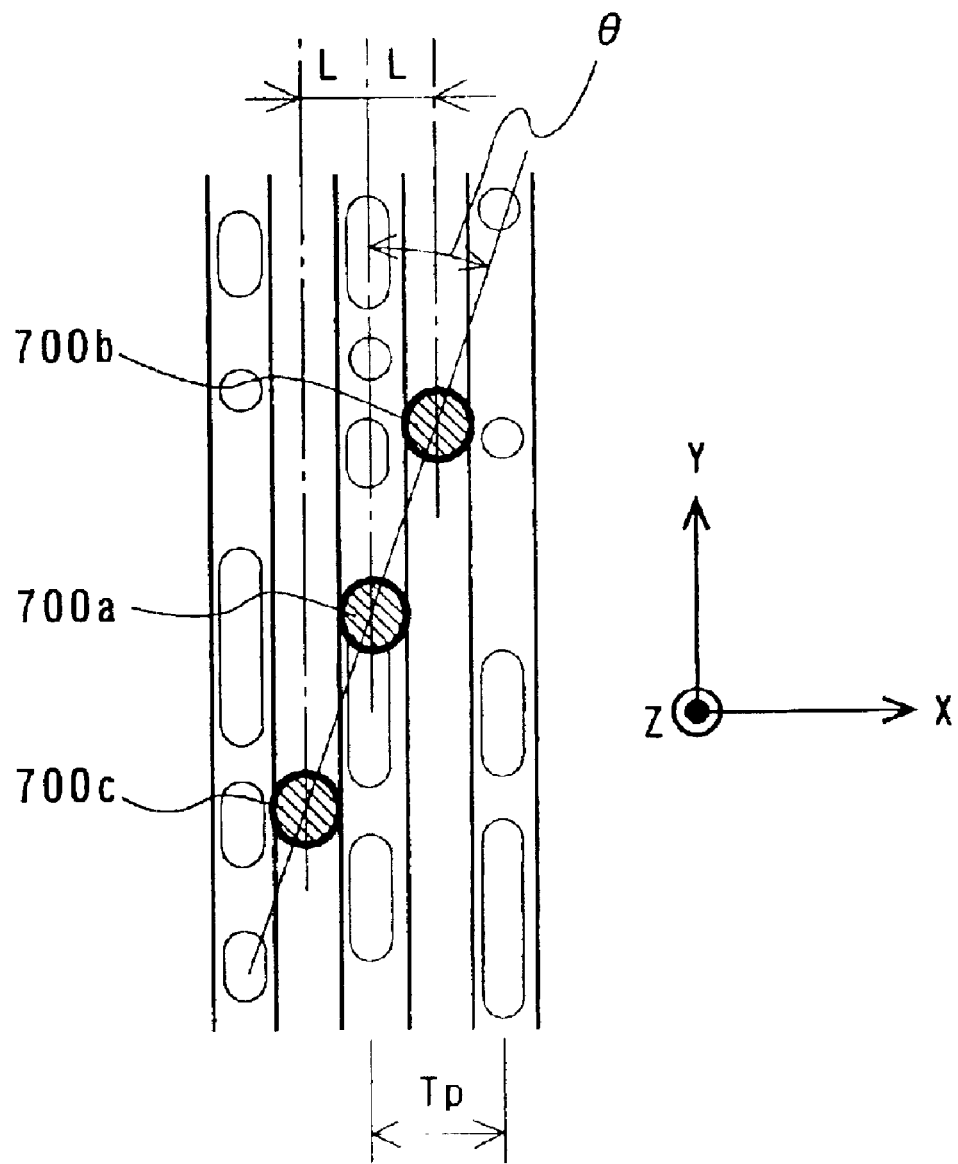
FIG. 12 shows the relationship between tracks and beams in a conventional optical pickup head device.

FIG. 9 shows an example of an information recording/reproducing apparatus that uses the optical pickup head device described above. The information recording/reproducing apparatus includes an optical pickup head device 80, an optical recording medium driver 81, an optical pickup head device driver 82, an electric circuit 83, and a power source 84. The driver 81 rotates an optical recording medium 41. The driver 82 includes a feed motor 85 and a feed screw 86, which constitute a so-called traverse mechanism. The feed motor 85 is driven to rotate the feed screw 86 connected directly to the rotation axis of the feed motor 85, and thus the optical pickup head device 80 is transferred to a desired position in the radial direction of the optical recording medium 41. The optical pickup head device 80 sends to the electric circuit 83 a signal that corresponds to the positional relationship between the optical pickup head device 80 and the optical recording medium 41. The electric circuit 83 amplifies or calculates this signal and slightly moves the optical pickup head device 80 or an objective lens in the optical pickup head device 80. The optical pickup head device 80 also sends to the electric circuit 83 a signal obtained by reading information recorded on the optical recording medium 41. Moreover, the electric circuit 83 demodulates information recorded on the optical recording medium 41. Actuators 91, 92 drive the objective lens 56 in the optical pickup head device. Using the above signal and the driver 82 or actuators 91, 92, focusing servo and tracking servo are performed to read, write, or erase information on the optical recording medium 41. The power source 84 supplies electricity needed for operation to each of the electric circuit 83, the optical pickup head device driver 82, and the optical recording medium driver 81.

The information recording/reproducing apparatus of this embodiment can record/reproduce information faithfully because it uses the optical pickup head device that can suppress offset fluctuations caused in a tracking error signal when the objective lens 56 follows tracking or the optical recording medium 41 tilts and can perform stable tracking control.

The optical pickup head device in Embodiments 1 to 5 has the configuration in which a beam emitted from a single light source enters a diffraction grating to generate a plurality of beams. However, the present invention is not limited to this configuration, and various modifications may be made in the invention without departing from the spirit and the scope thereof. For example, a plurality of beams may be generated by using a plurality of semiconductor lasers formed on the same semiconductor substrate instead of the diffraction grating. In this case, to expand beams (sub-beams) that correspond to the first-order diffracted light beams in Embodiment 1 in the direction parallel to a tangent to the track, the transverse mode of the semiconductor laser that emits those beams should be changed into a multimode. The expansion of the sub-beams in the track direction can provide the same effect as that in the above embodiments.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical pickup head device comprising:
   a light source for emitting a light beam;
   a diffraction means for diffracting the light beam from the light source into a plurality of beams of zero-order diffracted light and at least first-order diffracted light;
   a convergence means for converging the beams from the diffraction means on an optical recording medium;
   a beam splitting means for splitting the beams reflected from the optical recording medium; and
   a photodetection means for receiving the beams from the beam splitting means and outputting a signal that corresponds to an amount of light received,
   wherein the optical recording medium comprises tracks for recording information,
   the diffraction means comprises grating patterns with a nonuniform period or phase,
   a size of the at least first-order diffracted light converged on the optical recording medium is larger in a direction parallel to a tangent to the track than in a direction perpendicular to the tangent, and
   P1/P0>PW2/PW1 is established, where PW1 represents power of the zero-order diffracted light converged on the optical recording medium that is required to record information on the optical recording medium, PW2 represents maximum power of the zero-order diffracted light converged on the optical recording medium that allows information recorded on the optical recording medium to be reproduced without being erased, P0 represents a light amount of the zero-order diffracted light converged on the optical recording medium, and P1 represents a light amount of one of the at least first-order diffracted light converged on the optical recording medium.

2. The optical pickup head device according to claim 1, wherein the period of the grating patterns formed on the diffraction means changes gradually.

3. The optical pickup head device according to claim 1, wherein the grating patterns on both sides of a central portion of the diffraction means differ from each other in phase.

4. The optical pickup head device according to claim 3, wherein the phases of the grating patterns on both sides of the central portion are reversed by 180 degrees with respect to each other.

5. The optical pickup head device according to claim 3, wherein the central portion has a different grating pattern from the grating patterns on both sides of the central portion, and the phases of the grating patterns on both sides of the central portion are reversed by 180 degrees with respect to each other.

6. The optical pickup head device according to claim 1, wherein the diffraction means comprises a first pattern region, a second pattern region, and a third pattern region, the first pattern region is sandwiched between the second pattern region and the third pattern region, and a grating pattern is formed in the first pattern region and not in the second pattern region and the third pattern region.

7. The optical pickup head device according to claim 1, wherein the diffraction means comprises a first pattern region, a second pattern region, and a third pattern region, the first pattern region is sandwiched between the second pattern region and the third pattern region, and a grating pattern formed in the first pattern region differs from that formed in the second pattern region and the third pattern region.

8. The optical pickup head device according to claim 6, wherein an average depth of the grating pattern formed in the first pattern region is equal to an average depth of each of the second pattern region and the third pattern region.

9. The optical pickup head device according to claim 7, wherein an average depth of the grating pattern formed in the first pattern region is equal to an average depth of each of the second pattern region and the third pattern region.

10. The optical pickup head device according to claim 1, wherein a plurality of diffracted light beams converged on the optical recording medium have the same size in a direction perpendicular to the tracks.

11. The optical pickup head device according to claim 1, wherein the device satisfies $(S1/S0)^{0.5} \cdot PW2/PW1 > P1/P0 > PW2/PW1$, where S0 represents a size of the zero-order diffracted light converged on the optical recording medium in the direction parallel to a tangent to the track and S1 represents a size of the at least first-order diffracted light converged on the optical recording medium in the direction parallel to a tangent to the track.

12. The optical pickup head device according to claim 1, wherein the optical recording medium comprises two or more information recording planes.

13. An information recording/reproducing apparatus comprising:
   the optical pickup head device according to claim 1;
   a driver for changing a relative position between an information recording medium and the optical pickup head device; and
   an electric signal processor for performing an operation with a signal output from the optical pickup head device and providing desired information.

14. A method for recording information on an optical recording medium with an optical pickup head device,
   wherein the optical pickup head device comprises a light emitting means for emitting a plurality of light beams, a convergence means for converging the beams from the light emitting means on the optical recording medium, a beam splitting means for splitting the beams reflected from the optical recording medium, and a photodetection means for receiving the beams from the beam splitting means and outputting a signal that corresponds to an amount of light received,
   the optical recording medium comprises tracks for recording information, the beams comprise a main beam and sub-beams: the main beam being used to record information on the optical recording medium by causing a physical change in the optical recording medium; and the sub-beams being the beams other than the main beam, a size of the sub-beams converged on the optical recording medium is larger in a direction parallel to a tangent to the track than in a direction perpendicular to the tangent, and $P1/P0 > PW2/PW1$ is established, where PW1 represents power of the main beam converged on the optical recording medium that is required to record information on the optical recording medium, PW2 represents maximum power of the main beam converged on the optical recording medium that allows information recorded on the optical recording medium to be reproduced without being erased, P0 represents a light amount of the main beam converged on the optical recording medium, and P1 represents a light amount of one of the sub-beams converged on the optical recording medium.

15. The method according to claim 14, wherein the light emitting means comprises a light source for emitting a single light beam and a diffraction means for diffracting the single light beam into a plurality of beams of zero-order diffracted light and at least first-order diffracted light, the zero-order diffracted light is used as the main beam and the at least first-order diffracted light is used as the sub-beams, and the diffraction means comprises grating patterns with a nonuniform period or phase.

* * * * *